Figure 1:
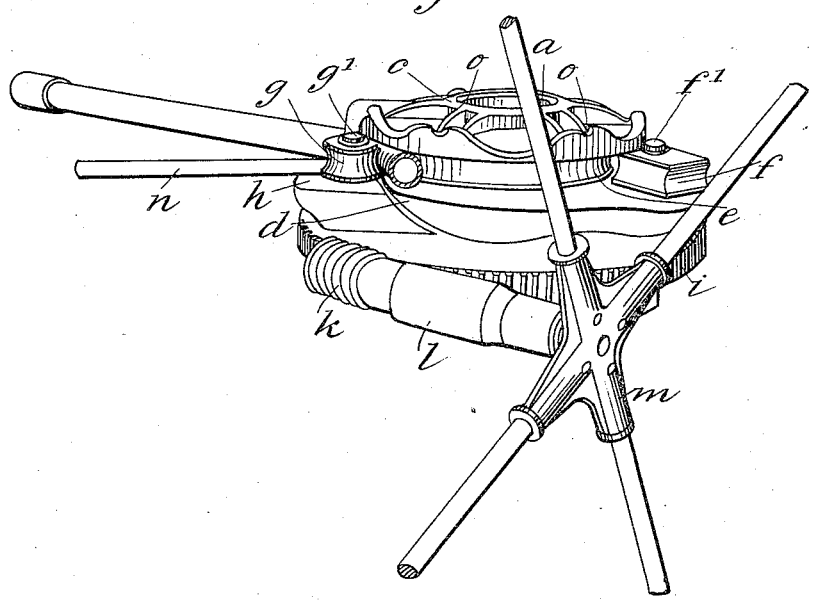

No. 862,339. PATENTED AUG. 6, 1907.
W. KENNEDY.
APPARATUS FOR BENDING METAL TUBES.
APPLICATION FILED OCT. 3, 1905.

2 SHEETS—SHEET 1.

WITNESSES

INVENTOR

No. 862,339. PATENTED AUG. 6, 1907.
W. KENNEDY.
APPARATUS FOR BENDING METAL TUBES.
APPLICATION FILED OCT. 3, 1905.
2 SHEETS—SHEET 2.
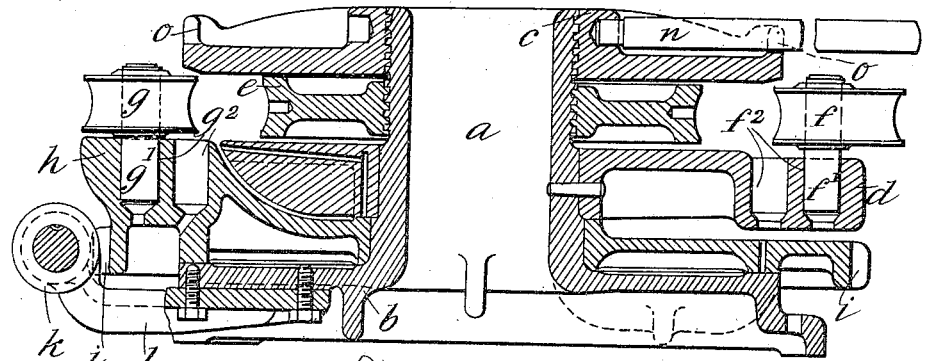
Fig. 2.
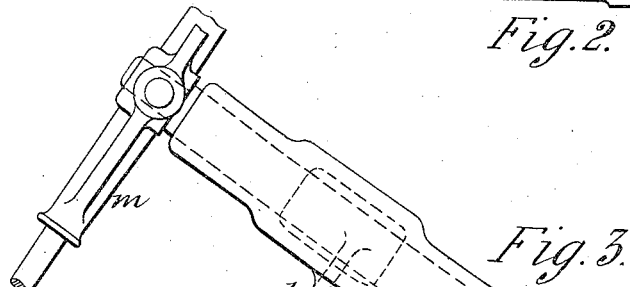
Fig. 3.
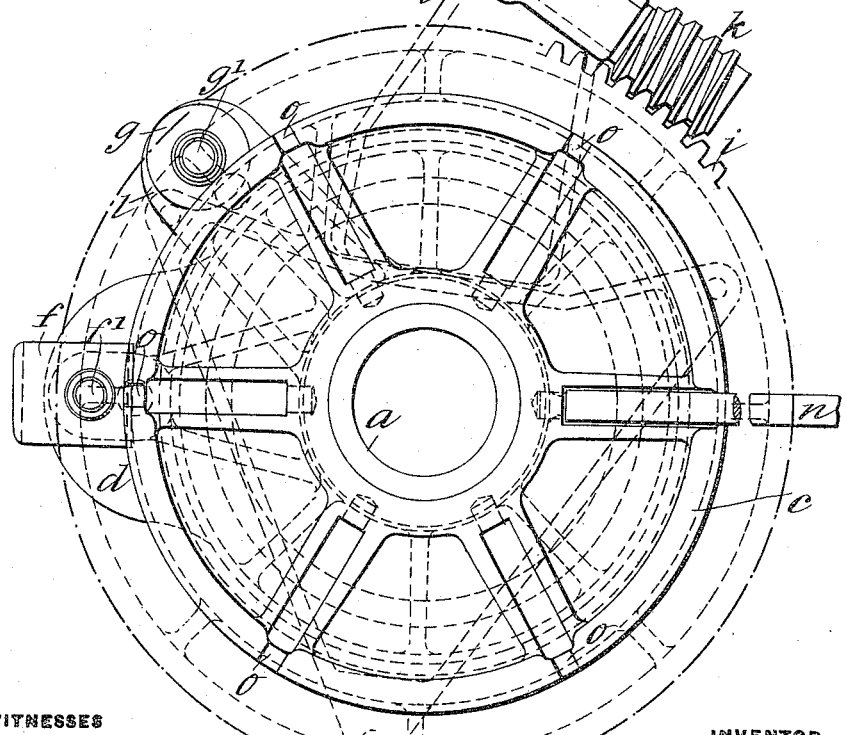
WITNESSES
INVENTOR
William Kennedy

UNITED STATES PATENT OFFICE.

WILLIAM KENNEDY, OF WEST DRAYTON, ENGLAND.

APPARATUS FOR BENDING METAL TUBES.

No. 862,339.

Specification of Letters Patent.

Patented Aug. 6, 1907.

Application filed October 3, 1906. Serial No. 281,128.

*To all whom it may concern:*

Be it known that I, WILLIAM KENNEDY, a subject of the King of Great Britain, residing at 4 Furzeham road, West Drayton, in the county of Middlesex, England, mechanic, have invented certain new and useful Improvements in Apparatus for Bending Metal Tubes, Rods, or the Like, of which the following is a specification.

This invention consists in improvements in the apparatus described in the specification to application for United States patent filed 6 October 1904, Serial No. 227390, and has for its object to adapt such apparatus to the bending of large tubes, rods, bars, or lengths of metal, and also for use as a vise for holding such. The improved construction also allows the bending force to be steadily applied and regulated.

The tube or rod to be bent is clamped between a flange which is fixed with respect to a central plug round which the tube is bent and a screwed flange or nut on the central plug or mandrel. The radius of the bend may be varied by slipping rings or segments of rings over the mandrel.

The tube is bent between a fixed stop, suitably shaped for its reception and adjustably pivoted in an extension of the fixed flange, and a movable stop mounted in an arm which turns about a pivot concentric with the flanges and mandrel.

The pivoted arm may itself be used as the lever for applying the bending force, but for large tubes and preferably also for small tubes, it is applied by means of a screw lever mounted on the pivoted arm and provided with a block or stop suitably shaped to receive the tube.

The screwed flange or nut may be screwed up or down for removal or clamping of the tube, on the central plug or mandrel, by means of the pivoted arm which can be rigidly coupled with the screwed flange for this purpose, as by a pin engaging with the pivoted arm and entering a socket in the screwed flange.

In the accompanying drawings, Figure 1 is a perspective view of the improved apparatus; Fig. 2 a central vertical section, and Fig. 3 a plan view.

A central plug or tube $a$ fixed to or formed integrally with the base $b$ is externally screw-threaded for the reception of a screwed flange or nut $c$, between which and a fixed flange $d$ pinned to the plug or tube $a$ the tube or the like to be bent is secured. The radius of the bend is determined by the effective diameter of the central plug which may be varied as required by means of suitably shaped rings $e$ screwed thereon.

The tube is bent between a fixed stop, consisting of a suitably shaped block or roller $f$, mounted on a pin $f'$ which can be inserted in one or other of the sockets $f^2$ in the fixed flange $d$, and a similar revoluble stop $g$ $g'$ which is stepped in one or other of the holes $g^2$ in a bracket or disk $h$ which is removably mounted on the lower part of the central plug $a$, between the fixed flange and the base.

The movable stop $g$ is turned about the central axis by means of a screw lever consisting as shown of a worm wheel $i$ formed on or secured to the disk $h$ and a worm $k$ gearing therewith and journaled in a bracket $l$ fixed to the base $b$, the worm shaft being provided with a suitable lever handle $m$.

The screwed flange or nut $c$ may be screwed up or down to release or clamp the tube by means of a rod or rods such as $n$ which can be inserted in suitably formed recesses or holes $o$ in the flange $c$ for this purpose, or by means of the screw lever $k$ $i$ and the stop $g$ which may be temporarily coupled with the nut $c$ for this purpose by means of a rod or pin such as $n'$ inserted in one of the holes $o$ and suitably bent to engage the stop $g$ and apply the power transmitted through the screw lever $k$ $i$ to rotating the flange or nut $c$.

1. In apparatus for bending metal tubes, rods, or the like, the combination of a central screw-threaded plug having a fixed flange and a flange screwed thereon said flanges coöperating to clamp the tube, rod, or the like during the bending action, a stop on the fixed flange, a bracket mounted to revolve around the central plug, a stop on said bracket, and means for revolving the bracket upon the plug; substantially as described.

2. In apparatus for bending metal tubes, rods or the like, the combination of a central screw-threaded plug having a flange screwed thereon, a bracket mounted to revolve round the central plug, a stop on said bracket, means for revolving said bracket upon the central plug, and means for temporarily coupling said bracket with the screwed flange, substantially as and for the purpose set forth.

In testimony whereof I have signed my name to this specification in the presence of two subscribing witnesses.

W. KENNEDY.

Witnesses:
 OLIVER IRMAN,
 JOSEPH MILLARD.